United States Patent [19]

de la Riviere

[11] 4,193,777

[45] Mar. 18, 1980

[54] PAINTING ROOM WITH RECOVERY ARRANGEMENT

[75] Inventor: François-Xavier J. de la Riviere, Paris, France

[73] Assignee: Regie Nationale des Usines Renault, Boulogne-Billancourt, France

[21] Appl. No.: 922,057

[22] Filed: Jul. 5, 1978

[30] Foreign Application Priority Data

Jul. 5, 1977 [FR] France .................................. 77 20697

[51] Int. Cl.² ............................................. B01D 46/04
[52] U.S. Cl. ......................................... 55/96; 55/290; 55/295; 55/466; 55/524; 98/115 Sb; 427/345
[58] Field of Search ................. 55/91, 96, 242, 243, 55/282, 290, 295, 351, 524, 466; 98/115 SB; 427/345

[56] References Cited

U.S. PATENT DOCUMENTS

| | | | |
|---|---|---|---|
| 2,227,481 | 1/1941 | Bates | 98/115 SB |
| 2,271,401 | 1/1942 | Sainty | 55/243 |
| 2,752,003 | 1/1956 | Hershey, Jr. et al. | 98/115 SB |
| 3,114,703 | 12/1963 | Brison | 209/11 |
| 3,395,972 | 8/1968 | Hardison | 98/115 SB |
| 3,557,536 | 1/1971 | Ririe | 55/523 |
| 3,923,653 | 12/1975 | Lavins, Jr. | 55/282 |
| 3,950,152 | 4/1976 | Guon | 55/96 |
| 4,036,609 | 7/1977 | Pircon | 55/91 |

FOREIGN PATENT DOCUMENTS

| | | | |
|---|---|---|---|
| 2347068 | 1/1975 | Fed. Rep. of Germany | 98/115 SB |
| 2114133 | 6/1972 | France | 98/115 SB |
| 1377363 | 12/1974 | United Kingdom | 98/115 SB |

*Primary Examiner*—Bernard Nozick
*Attorney, Agent, or Firm*—Oblon, Fisher, Spivak, McClelland & Maier

[57] ABSTRACT

Paint particles suspended in a gas are removed from the suspension by coating the surfaces of baffles with a material to which paint particles adhere and having a melting point below 100° C.; positioning said coated baffles in a sequence spaced apart from one another; collecting paint particles suspended in a gas on the coated baffles by flowing said gas around said baffles to thereby saturate said coating with paint particles; melting said paint saturated coating; and removing said paint saturated coating from the baffles.

8 Claims, 1 Drawing Figure

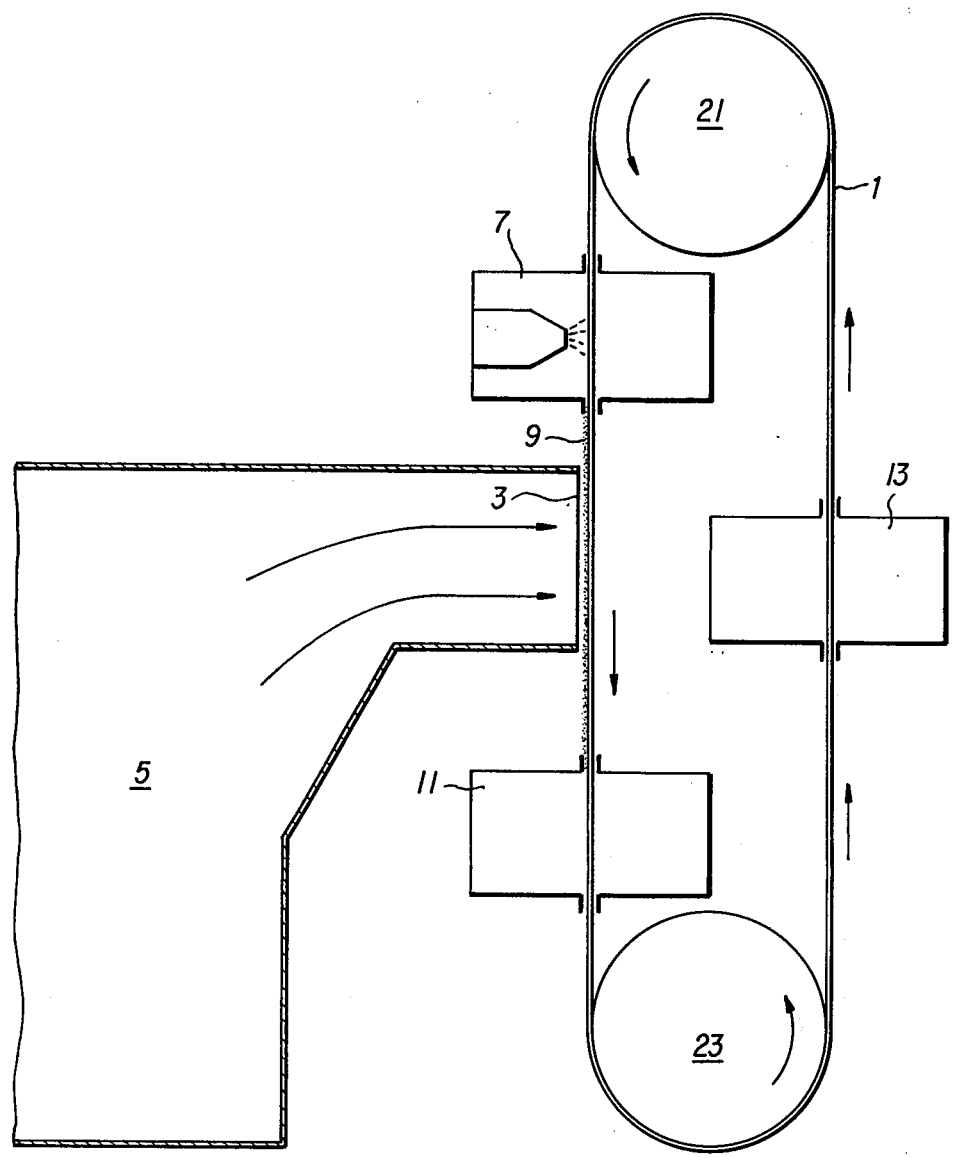

PAINTING ROOM WITH RECOVERY ARRANGEMENT

BACKGROUND OF THE INVENTION

1. Field of the Invention

The present invention relates to a method of recovering sprayed paint which misses the surface it is intended to coat.

2. Description of the Prior Art

French Pat. No. 76/07446 describes an arrangement of baffles employed for capturing paint particles, said baffles being situated downstream from a room and positioned in an array such that air containing entrained paint particles is forced to deviate from its linear flow into a more circuitous path around the baffle. Because of this arrangement of baffle, the entrained particles collide with the baffles where they are trapped while the purified air escapes to the atmosphere. With a sufficient accumulation of paint on the baffles, the paint runs off the baffles by force of gravity into recovery gutters. The recovery process is enhanced by washing the filters with a suitable solvent such as naphtha and agitated ultra-sonically, if necessary. Regeneration of the baffles is improved by coating their surfaces with an anti-adherent film of a material such as polytetrafluoroethylene or a silicone elastomer. A need, however, continues to exist for an improved technique of recovering the paint which accumulates on paint baffles without using a solvent.

SUMMARY OF THE INVENTION

Accordingly, one object of the present invention is to provide a method of recovering paint particles on baffles which have missed the surface intended to be coated.

Another object of the present invention is to provide a method of recovering particles of paint entrained in air from baffles without the use of a solvent.

Briefly, these objects and other objects as hereinafter will become more readily apparent can be attained in a process for removing paint particles from a gas containing a suspension of paint particles by coating the surfaces of baffles with a material to which paint particles adhere and having a melting point below 100° C.; positioning said coated baffles in a sequence spaced apart from one another; collecting paint particles suspended in a gas on the coated baffles by flowing said gas around said baffles to thereby saturate said coating with paint particles; melting said paint saturated coating; and removing said paint saturated coating from the baffles.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein: the FIGURE represents a diagram of an embodiment of the paint removing procedure of the present invention.

DESCRIPTION OF THE PREFERRED EMBODIMENTS

The present invention relates to a different procedure of recovering the paint deposited on paint removing baffles, which avoids the use of solvents, which have the drawbacks of acting as a source of atmospheric pollution as well as being a potential fire hazard. According to the method of the present invention, particles of paint suspended in air, collect and adhere on the baffles which are coated with a product which is solid at the operating temperature of the painting environment and which are positioned in a staggered sequence spaced apart from one another in the painting environment. The solid product has a melting temperature of less than 100° C., preferably between 40° C. and 80° C. Suitable solid coating products include paraffin, polyethylene wax, and copolymer waxes such as ethylene and propylene, which can be chlorinated or fluorinated.

The above solid products may be applied to the baffles by pulverization or by application with a brush after being dissolved in a suitable solvent, e.g. cyclohexane for paraffin. Still further, the solid product can be applied as a liquid when it is above its melting point, by any suitable means, such as by immersion in a liquid bath, with a roller or brush, by spraying or the like. A preferred mode of application is immersion of the baffles in the liquid product which offers the advantage of readily applying a coating of the product to any desired thickness by adjusting the temperature of the bath and the time of immersion of the object to be protected.

advantage of readily applying a coating a the product to any desired thickness by adjusting the temperature o the bath and the time of immersion of the object to be protected.

A suitable coating should be from 100–300 microns thick, but preferably more than 100 microns thick, and more preferably closer to 200 microns. The baffles thus coated are positioned in the room in which spray painting will occur. The particles of sprayed paint which miss their target and float in the air collect and settle on the coated baffles while the purified air escapes to the atmosphere. When a first set of coated baffles is saturated with particles, the flow of air containing paint particles is diverted towards a second set of baffles, while the first is detached from its installation and replaced by new baffles.

The baffles charged with paint are then subjected to a temperature above that for melting the protective coating, and, if necessary, to slight mechanical scraping. The baffles can be heated, for example, by placing them in an oven, by contacting them with steam, or by means of a resistance heater. Scraping of the baffles may be done with a metallic, rubber or plastic blade heated to a temperature above the melting point of the protective product.

In still another alternative technique the coated baffles charged with paint can be immersed in a vat containing molten coating material. Instead of scraping the baffles, the baffles can be gently agitated in the vat, possibly in combination with agitation of the molten product itself in the vat.

The technique of the present invention is particularly useful for recovery of paint utilized in the automobile industry. Such paints are immiscible in paraffin, and as a result, sedimentation of the paint in the bottom of the paraffin bath is observed and thus the paint and paraffin can be separated and recycled. This process is particularly suited to a continuous operation where the filters consist of one or more endless arrays of sheets which move across the outlet of the paint-charged air to collect the particles as shown in the FIGURE. Sheet 1 composed of an array of individual baffles 2, traveling about guide rollers 21 and 23, before reaching the outlet 3 of painting chamber 5 through which paint-charged air is discharged, traverses a reservoir containing a molten material which provides the sheet 1 with a coating 9. After sheet 1 passes outlet 3, it traverses an analogous second reservoir 11 in which the paint charged coating 9 is melted and left behind. Before sheet 1 is provided with a fresh coating it can be rinsed in reservoir 13 after the paint charged coating has been removed.

The application of the protective solid product can be carried out not only on the baffles, but also on any surface in the room exposed to undesired sprays of paint, such as walls, hangers, conveyors and the like.

Having now fully described the invention, it will be apparent to one of ordinary skill in the art that many changes and modifications can be made thereto without departing from the spirit or scope of the invention as set forth herein.

What is claimed as new and intended to be secured by Letters Patent is:

1. A process for recovering particles of paint suspended in a gas, which comprises:
   coating the surfaces of baffles with a material which is solid at the operating temperature of the painting environment and to which paint particles adhere, and having a melting point below 100° C.;
   positioning said coated baffles in a sequence spaced apart from one another;
   collecting paint particles suspended in a gas on said coated baffles by flowing said gas around said baffles to thereby saturate said coating with paint particles;
   utilizing heat to melt said paint saturated coating; and
   removing said paint saturated coating from said baffles.

2. The method of claim 1, wherein said material has a melting point of 40° C. to 80° C.

3. The method of claim 1, wherein said filter coating is a material selected from the group consisting of paraffin, polyethylene wax and copolymer waxes which can be chlorinated or fluorinated.

4. The method of claim 1, wherein said gas is air and the suspended paint particles are recovered from air in a paint room.

5. The method of claim 1, wherein said baffles are coated by immersing said baffles in a vat containing liquid coating material.

6. The method of claim 1, wherein said baffles are at least one endless sheet which flows through a reservoir containing said paint adherent material in liquid form where the sheet is coated with said material and then the coated shut passes from said reservoir where it is exposed to said air containing paint particles, said paint saturated endless sheet then proceeding into a second reservoir in which the paint saturated coating is melted and the paint in said molten material is recovered by decantation or centrifugation.

7. The method of claim 1, wherein said coating material is immiscible with the paint being removed thereby enabling easy separation of insoluble paint from said coating material.

8. The method of claim 1, wherein the removal of paint saturated coating material is facilitated by scraping said material from said baffles.

* * * * *